(12) United States Patent
Wang et al.

(10) Patent No.: US 12,141,038 B2
(45) Date of Patent: *Nov. 12, 2024

(54) ERROR RECOVERY FOR NON-VOLATILE MEMORY MODULES

(71) Applicant: Advanced Micro Devices, Inc., Santa Clara, CA (US)

(72) Inventors: Jing Wang, Austin, TX (US); James R. Magro, Austin, TX (US); Kedarnath Balakrishnan, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,350

(22) Filed: Dec. 19, 2022

(65) Prior Publication Data

US 2023/0125792 A1   Apr. 27, 2023

Related U.S. Application Data

(63) Continuation of application No. 16/729,994, filed on Dec. 30, 2019, now Pat. No. 11,531,601.

(51) Int. Cl.
*G06F 11/14* (2006.01)
*G06F 3/06* (2006.01)

(52) U.S. Cl.
CPC ........ *G06F 11/1474* (2013.01); *G06F 3/0619* (2013.01); *G06F 3/0659* (2013.01); *G06F 3/068* (2013.01); *G06F 2201/82* (2013.01)

(58) Field of Classification Search
CPC .. G06F 11/1474; G06F 3/0619; G06F 3/0659; G06F 3/068; G06F 2201/82; G06F 11/104

(Continued)

(56) References Cited

U.S. PATENT DOCUMENTS 6,640,313 B1    10/2003  Quach
7,343,457 B1 *   3/2008  End, III ............... G06F 13/1605
                                              711/158

(Continued)

FOREIGN PATENT DOCUMENTS

KR    10-2016-014868 A    12/2016
KR    10-2016-0144577 A   12/2016

OTHER PUBLICATIONS

International Search Report and Written Opinion for International Application No. PCT/US2020/063922, mailed Mar. 11, 2021, 8 pages.

(Continued)

*Primary Examiner* — Yair Leibovich
(74) *Attorney, Agent, or Firm* — Polansky & Associates, P.L.L.C.; Paul J. Polansky; Nathan H. Calvert

(57) ABSTRACT

A memory controller includes a command queue, a memory interface queue, at least one storage queue, and a replay control circuit. The command queue has a first input for receiving memory access commands. The memory interface queue receives commands selected from the command queue and couples to a heterogeneous memory channel which is coupled to at least one non-volatile storage class memory (SCM) module. The at least one storage queue stores memory access commands that are placed in the memory interface queue. The replay control circuit detects that an error has occurred requiring a recovery sequence, and in response to the error, initiates the recovery sequence. In the recovery sequence, the replay control circuit transmits selected memory access commands from the at least one storage queue by grouping non-volatile read commands together separately from all pending volatile reads, volatile writes, and non-volatile writes.

20 Claims, 6 Drawing Sheets

(58) Field of Classification Search
USPC .......................................................... 714/6.2
See application file for complete search history.

(56) References Cited

U.S. PATENT DOCUMENTS

| | | |
|---|---|---|
| 9,576,637 B1 | 2/2017 | Balakrishnan |
| 9,817,610 B1 | 11/2017 | Shallal et al. |
| 11,137,941 B2 | 10/2021 | Wang |
| 2003/0177320 A1 | 9/2003 | Sah et al. |
| 2004/0162949 A1 | 8/2004 | Scott et al. |
| 2007/0226579 A1 | 9/2007 | Alexander et al. |
| 2008/0082750 A1 | 4/2008 | Okin et al. |
| 2010/0293436 A1 | 11/2010 | Coteus et al. |
| 2013/0191683 A1 | 7/2013 | Gower et al. |
| 2014/0059297 A1 | 2/2014 | Biswas et al. |
| 2015/0178002 A1 | 6/2015 | Lowery et al. |
| 2015/0378841 A1 | 12/2015 | Jayakumar et al. |
| 2016/0139807 A1 | 5/2016 | Lesartre et al. |
| 2016/0253101 A1 | 9/2016 | Ipek et al. |
| 2016/0357481 A1 | 12/2016 | Nam et al. |
| 2018/0018221 A1 | 1/2018 | Magro et al. |
| 2019/0004985 A1 | 1/2019 | Lee et al. |
| 2020/0341870 A1 | 10/2020 | Frolikov |
| 2021/0049062 A1 | 2/2021 | Balakrishnan |
| 2021/0200467 A1* | 7/2021 | Magro ................ G06F 12/0238 |

OTHER PUBLICATIONS

International Search Report and Written Opinion for International Application No. PCT/US2020/064188, mailed Mar. 26, 2021, 9 pages.

* cited by examiner

ERROR RECOVERY FOR NON-VOLATILE MEMORY MODULES

This application is a continuation of U.S. patent application Ser. No. 16/729,994, filed Dec. 30, 2019, and entitled "Error Recovery for Non-Volatile Memory Modules," which is incorporated by reference herein in its entirety.

BACKGROUND

Computer systems typically use inexpensive and high-density dynamic random access memory (DRAM) chips for main memory. Most DRAM chips sold today are compatible with various double data rate (DDR) DRAM standards promulgated by the Joint Electron Devices Engineering Council (JEDEC). DDR memory controllers are used to manage the interface between various memory accessing agents and DDR DRAMs according to published DDR standards.

A non-volatile dual-inline memory module with persistent storage ("NVDIMM-P") is a storage class memory that can be used in place of standard DDR DIMMs, but includes persistent memory. The use of persistent, or "non-volatile", memory with a memory channel that supports volatile memory such as DRAM presents some new problems. Reading from non-volatile memory on a non-volatile DIMM is a slower process than reading from DRAM. Non-volatile memory reads typically complete in a nondeterministic time, as opposed to DRAM reads which complete faster in a deterministic, known time. Dealing with differences such as these presents various challenges in designing memory controllers that can interact with non-volatile DIMMs.

Figure 1:
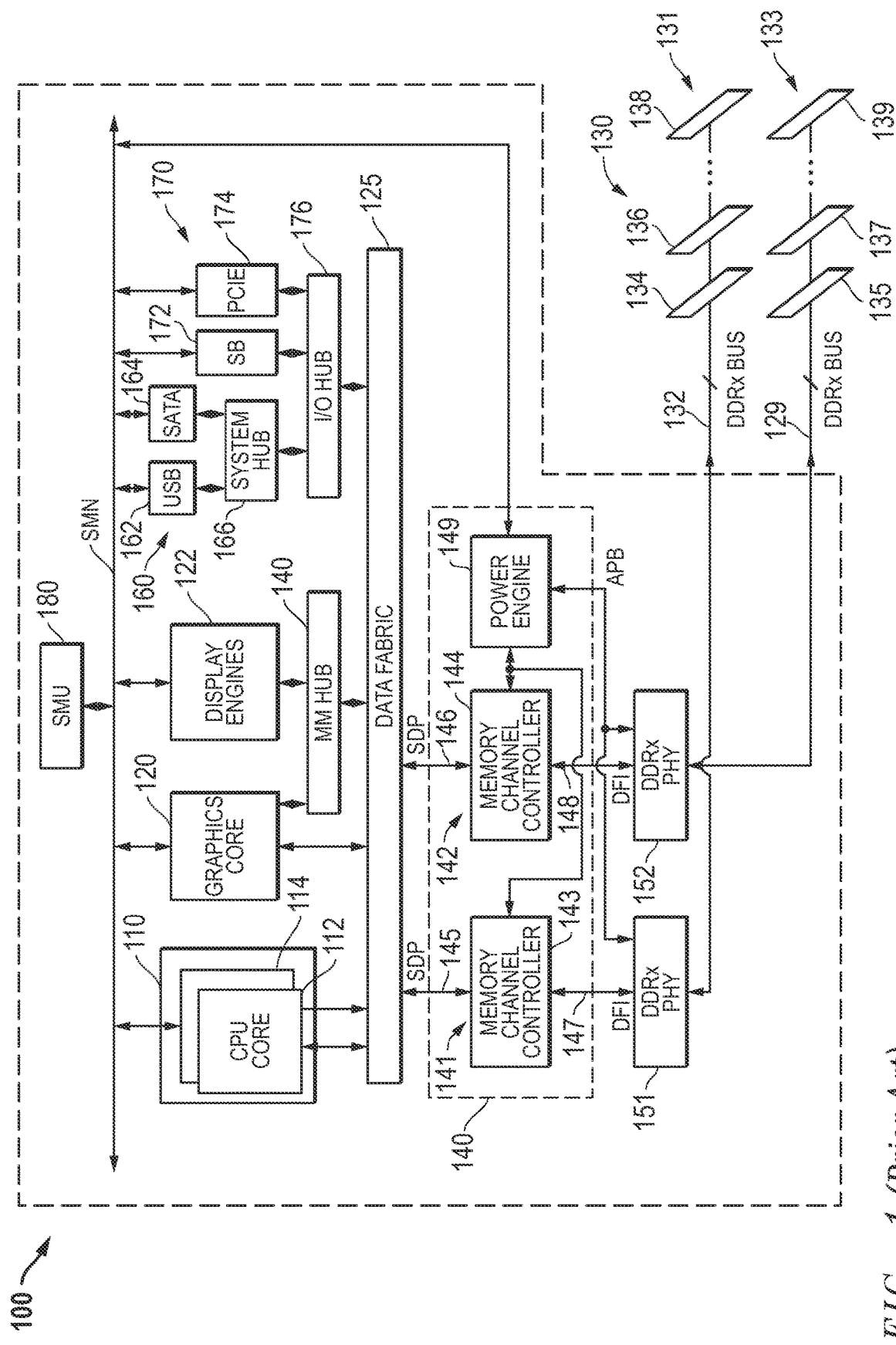
FIG. 1 illustrates in block diagram form an accelerated processing unit (APU) and memory system known in the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A memory controller includes a command queue, a memory interface queue, at least one storage queue, and a replay control circuit. The command queue has a first input for receiving memory access commands including volatile reads, volatile writes, non-volatile reads, and non-volatile writes, and an output, and having a plurality of entries. The memory interface queue has an input for receiving commands selected from the command queue, and an output for coupling to a heterogeneous memory channel to which is coupled at least one non-volatile storage class memory (SCM) module. The at least one storage queue stores memory access commands that are placed in the memory interface queue. The replay control circuit detects that an error has occurred requiring a recovery sequence, and in response initiates the recovery sequence. In the recovery sequence, the replay control circuit transmits selected memory access commands from the at least one storage queue by grouping non-volatile read commands together separately from all pending volatile reads, volatile writes, and non-volatile writes.

A method responds to errors in a memory system. The method includes receiving a plurality of memory access requests including volatile memory reads, volatile memory writes, non-volatile memory reads, and non-volatile memory writes. Memory access commands for fulfilling the memory access requests are placed in a memory interface queue. The memory access commands are transmitted from the memory interface queue to a heterogeneous memory channel coupled to at least one non-volatile SCM module. Memory access commands that are placed in the memory interface queue are stored in at least one storage queue. The method detects that an error has occurred requiring a recovery sequence, and in response, performs the recovery sequence including transmitting selected memory access commands from the at least one storage queue by grouping the transmission of all non-volatile reads separately from all pending volatile reads, volatile writes, and non-volatile writes.

A data processing system includes a central processing unit, a data fabric coupled to the central processing unit, and a memory controller coupled to the data fabric for fulfilling memory access requests from the central processing unit. The memory controller includes a command queue, a memory interface queue, at least one storage queue, and a replay control circuit. The command queue has a first input for receiving memory access commands including volatile reads, volatile writes, non-volatile reads, and non-volatile writes, and an output, and having a plurality of entries. The memory interface queue has an input for receiving commands selected from the command queue, and an output for coupling to a heterogeneous memory channel to which is coupled at least one non-volatile SCM module. The at least one storage queue stores memory access commands that are placed in the memory interface queue. The replay control circuit detects that an error has occurred requiring a recovery sequence, and in response initiates the recovery sequence. In the recovery sequence, the replay control circuit transmits selected memory access commands from the at least one storage queue by grouping non-volatile read commands together separately from all pending volatile reads, volatile writes, and non-volatile writes.

FIG. 1 illustrates in block diagram form an accelerated processing unit (APU) 100 and memory system 130 known in the prior art. APU 100 is an integrated circuit suitable for use as a processor in a host data processing system, and includes generally a central processing unit (CPU) core complex 110, a graphics core 120, a set of display engines 122, a memory management hub 140, a data fabric 125, a set of peripheral controllers 160, a set of peripheral bus controllers 170, and a system management unit (SMU) 180.

CPU core complex 110 includes a CPU core 112 and a CPU core 114. In this example, CPU core complex 110 includes two CPU cores, but in other embodiments CPU core complex 110 can include an arbitrary number of CPU cores. Each of CPU cores 112 and 114 is bidirectionally connected to a system management network (SMN), which forms a control fabric, and to data fabric 125, and is capable of providing memory access requests to data fabric 125. Each of CPU cores 112 and 114 may be unitary cores, or may further be a core complex with two or more unitary cores sharing certain resources such as caches.

Graphics core 120 is a high performance graphics processing unit (GPU) capable of performing graphics operations such as vertex processing, fragment processing, shading, texture blending, and the like in a highly integrated and parallel fashion. Graphics core 120 is bidirectionally connected to the SMN and to data fabric 125, and is capable of providing memory access requests to data fabric 125. In this regard, APU 100 may either support a unified memory architecture in which CPU core complex 110 and graphics core 120 share the same memory space, or a memory architecture in which CPU core complex 110 and graphics core 120 share a portion of the memory space, while graphics core 120 also uses a private graphics memory not accessible by CPU core complex 110.

Display engines 122 render and rasterize objects generated by graphics core 120 for display on a monitor. Graphics core 120 and display engines 122 are bidirectionally connected to common memory management hub 140 for uniform translation into appropriate addresses in memory system 130, and memory management hub 140 is bidirectionally connected to data fabric 125 for generating such memory accesses and receiving read data returned from the memory system.

Data fabric 125 includes a crossbar switch for routing memory access requests and memory responses between any memory accessing agent and memory management hub 140. It also includes a system memory map, defined by the system basic input/output system (BIOS), for determining destinations of memory accesses based on the system configuration, as well as buffers for each virtual connection.

Peripheral controllers 160 include a universal serial bus (USB) controller 162 and a Serial Advanced Technology Attachment (SATA) interface controller 164, each of which is bidirectionally connected to a system hub 166 and to the SMN bus. These two controllers are merely exemplary of peripheral controllers that may be used in APU 100.

Peripheral bus controllers 170 include a system controller or "Southbridge" (SB) 172 and a Peripheral Component Interconnect Express (PCIe) controller 174, each of which is bidirectionally connected to an input/output (I/O) hub 176 and to the SMN bus. I/O hub 176 is also bidirectionally connected to system hub 166 and to data fabric 125. Thus for example a CPU core can program registers in USB controller 162, SATA interface controller 164, SB 172, or PCIe controller 174 through accesses that data fabric 125 routes through I/O hub 176. Software and firmware for APU 100 are stored in a system data drive or system BIOS memory (not shown) which can be any of a variety of non-volatile memory types, such as read-only memory (ROM), flash electrically erasable programmable ROM (EEPROM), and the like. Typically, the BIOS memory is accessed through the PCIe bus, and the system data drive through the SATA interface.

SMU 180 is a local controller that controls the operation of the resources on APU 100 and synchronizes communication among them. SMU 180 manages power-up sequencing of the various processors on APU 100 and controls multiple off-chip devices via reset, enable and other signals. SMU 180 includes one or more clock sources (not shown), such as a phase locked loop (PLL), to provide clock signals for each of the components of APU 100. SMU 180 also manages power for the various processors and other functional blocks, and may receive measured power consumption values from CPU cores 112 and 114 and graphics core 120 to determine appropriate power states.

Memory management hub 140, and its associated physical interfaces (PHYs) 151 and 152 are integrated with APU 100 in this embodiment. Memory management hub 140 includes memory channels 141 and 142 and a power engine 149. Memory channel 141 includes a host interface 145, a memory channel controller 143, and a physical interface 147. Host interface 145 bidirectionally connects memory channel controller 143 to data fabric 125 over a serial presence detect link (SDP). Physical interface 147 bidirectionally connects memory channel controller 143 to PHY 151, and conforms to the DDR PHY Interface (DFI) Specification. Memory channel 142 includes a host interface 146, a memory channel controller 144, and a physical interface 148. Host interface 146 bidirectionally connects memory channel controller 144 to data fabric 125 over another SDP. Physical interface 148 bidirectionally connects memory channel controller 144 to PHY 152, and conforms to the DFI Specification. Power engine 149 is bidirectionally connected to SMU 180 over the SMN bus, to PHYs 151 and 152 over the Advanced Peripheral Bus (APB), and is also bidirectionally connected to memory channel controllers 143 and 144. PHY 151 has a bidirectional connection to memory channel 131. PHY 152 has a bidirectional connection memory channel 133.

Memory management hub 140 is an instantiation of a memory controller having two memory channel controllers and uses a shared power engine 149 to control operation of both memory channel controller 143 and memory channel controller 144 in a manner that will be described further below. Each of memory channels 141 and 142 can connect to state-of-the-art DDR memories such as DDR version four (DDR4), low power DDR4 (LPDDR4), graphics DDR version five (gDDR5), and high bandwidth memory (HBM), and can be adapted for future memory technologies. These memories provide high bus bandwidth and high speed operation. At the same time, they also provide low power modes to save power for battery-powered applications such as laptop computers, and also provide built-in thermal monitoring.

Memory system 130 includes a memory channel 131 and a memory channel 133. Memory channel 131 includes a set of dual inline memory modules (DIMMs) connected to a DDRx bus 132, including representative DIMMs 134, 136, and 138 that in this example correspond to separate ranks. Likewise, memory channel 133 includes a set of DIMMs connected to a DDRx bus 129, including representative DIMMs 135, 137, and 139.

APU 100 operates as the central processing unit (CPU) of a host data processing system and provides various buses and interfaces useful in modern computer systems. These interfaces include two double data rate (DDRx) memory channels, a PCIe root complex for connection to a PCIe link, a USB controller for connection to a USB network, and an interface to a SATA mass storage device.

APU 100 also implements various system monitoring and power saving functions. In particular one system monitoring function is thermal monitoring. For example, if APU 100 becomes hot, then SMU 180 can reduce the frequency and voltage of CPU cores 112 and 114 and/or graphics core 120. If APU 100 becomes too hot, then it can be shut down entirely. Thermal events can also be received from external sensors by SMU 180 via the SMN bus, and SMU 180 can reduce the clock frequency and/or power supply voltage in response.

Figure 2:
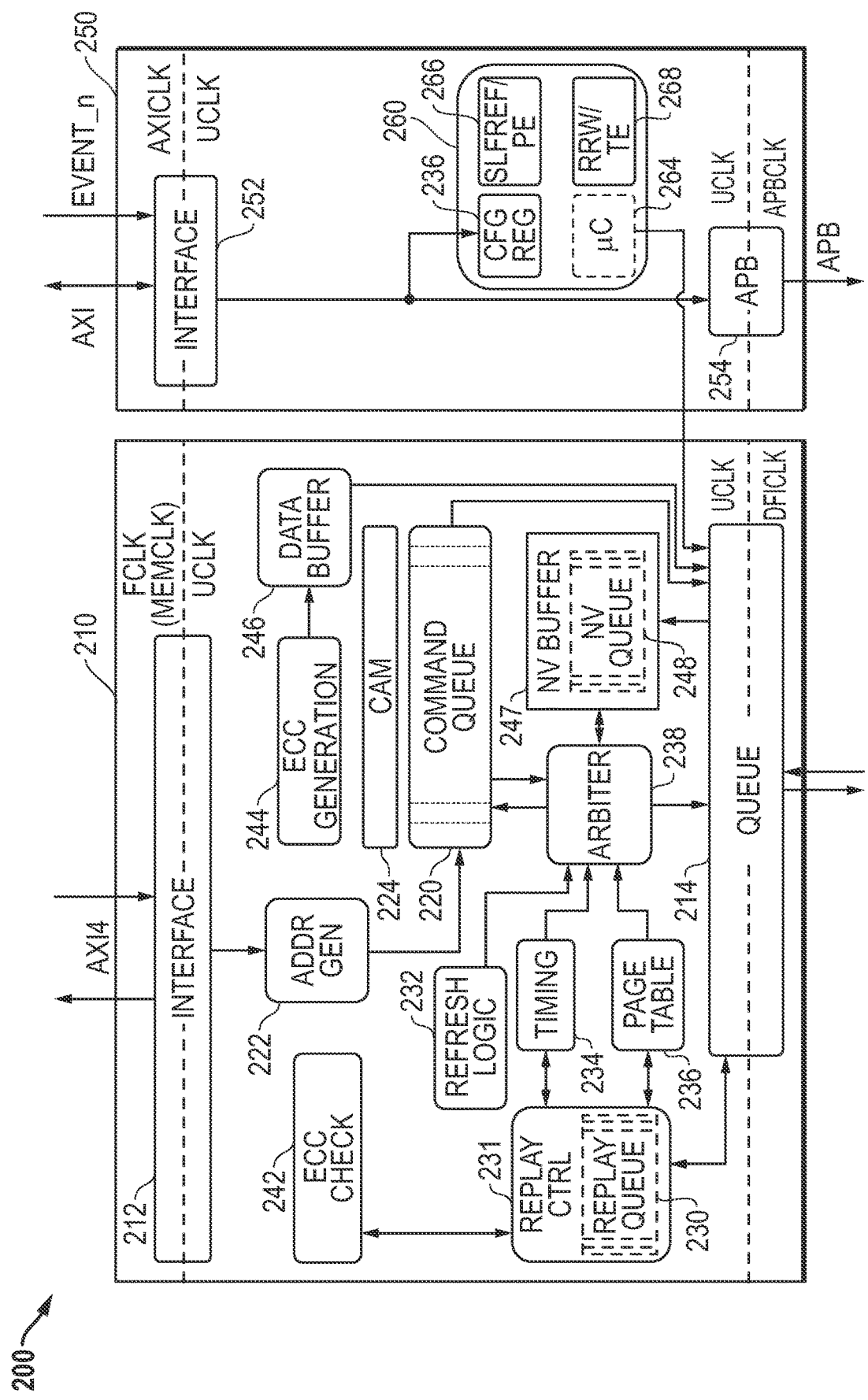
FIG. 2 illustrates in block diagram form a memory controller suitable for use in an APU like that of FIG. 1 according to some embodiments.

FIG. 2 illustrates in block diagram form a memory controller 200 that is suitable for use in an APU like that of FIG. 1. Memory controller 200 includes generally a memory channel controller 210 and a power controller 250. Memory channel controller 210 includes generally an interface 212, a memory interface queue 214 ("memory interface queue", "queue"), a command queue 220, an address generator 222, a content addressable memory (CAM) 224, replay control logic 231 including a replay queue 230, a refresh logic block 232, a timing block 234, a page table 236, an arbiter 238, an error correction code (ECC) check circuit 242, an ECC generation block 244, a data buffer 246, a non-volatile (NV) buffer 247, and a NV queue 248.

Interface 212 has a first bidirectional connection to data fabric 125 over an external bus, and has an output. In memory controller 200, this external bus is compatible with the advanced extensible interface version four specified by ARM Holdings, PLC of Cambridge, England, known as "AXI4", but can be other types of interfaces in other embodiments. Interface 212 translates memory access requests from a first clock domain known as the FCLK (or MEMCLK) domain to a second clock domain internal to memory controller 200 known as the UCLK domain. Similarly, memory interface queue 214 provides memory accesses from the UCLK domain to a DFICLK domain associated with the DFI interface.

Address generator 222 decodes addresses of memory access requests received from data fabric 125 over the AXI4 bus. The memory access requests include access addresses in the physical address space represented in a normalized format. Address generator 222 converts the normalized addresses into a format that can be used to address the actual memory devices in memory system 130, as well as to efficiently schedule related accesses. This format includes a region identifier that associates the memory access request with a particular rank, a row address, a column address, a bank address, and a bank group. On startup, the system BIOS queries the memory devices in memory system 130 to determine their size and configuration, and programs a set of configuration registers associated with address generator 222. Address generator 222 uses the configuration stored in the configuration registers to translate the normalized addresses into the appropriate format. Address generator 222 decodes the address range of the memory, including NVDIMM-P memory, and stores a decoded signal indicating whether the memory access request is a request to NVDIMM-P in command queue 220. Arbiter 238 can then prioritize the NVDIMM-P requests with appropriate priority relative to other requests. Command queue 220 is a queue of memory access requests received from the memory accessing agents in APU 100, such as CPU cores 112 and 114 and graphics core 120. Command queue 220 stores the address fields decoded by address generator 222 as well other address information that allows arbiter 238 to select memory accesses efficiently, including access type and quality of service (QoS) identifiers. CAM 224 includes information to enforce ordering rules, such as write after write (WAW) and read after write (RAW) ordering rules.

Error correction code (ECC) generation block 244 determines the ECC of write data to be sent to the NVDIMM-P. ECC check circuit 242 checks the received ECC against the incoming ECC.

Replay queue 230 is a temporary queue for storing selected memory accesses picked by arbiter 238 that are awaiting responses, such as address and command parity responses. Replay control logic 231 accesses ECC check circuit 242 to determine whether the returned ECC is correct or indicates an error. Replay control logic 231 initiates and controls a replay sequence in which accesses are replayed in the case of a parity or ECC error of one of these cycles. Replayed commands are placed in the memory interface queue 214.

Refresh logic 232 includes state machines for various powerdown, refresh, and termination resistance (ZQ) calibration cycles that are generated separately from normal read and write memory access requests received from memory accessing agents. For example, if a memory rank is in precharge powerdown, it must be periodically awakened to run refresh cycles. Refresh logic 232 generates refresh commands periodically to prevent data errors caused by leaking of charge off storage capacitors of memory cells in DRAM chips. In addition, refresh logic 232 periodically calibrates ZQ to prevent mismatch in on-die termination resistance due to thermal changes in the system.

Arbiter 238 is bidirectionally connected to command queue 220 and is the heart of memory channel controller 210. It improves efficiency by intelligent scheduling of accesses to improve the usage of the memory bus. Arbiter 238 uses timing block 234 to enforce proper timing relationships by determining whether certain accesses in command queue 220 are eligible for issuance based on DRAM timing parameters. For example, each DRAM has a minimum specified time between activate commands, known as "$t_{RC}$". Timing block 234 maintains a set of counters that determine eligibility based on this and other timing parameters specified in the JEDEC specification, and is bidirectionally connected to replay queue 230. Page table 236 maintains state information about active pages in each bank and rank of the memory channel for arbiter 238, and is bidirectionally connected to replay queue 230.

NV buffer 247 stores NV read commands in NV queue 248, both for use in replay sequences, and for managing NV read responses. NV buffer 247 is bidirectionally connected to memory interface queue 214 for handling RD_RDY and SEND commands, as further described below.

In response to write memory access requests received from interface 212, ECC generation block 244 computes an ECC according to the write data. Data buffer 246 stores the write data and ECC for received memory access requests. It outputs the combined write data/ECC to memory interface queue 214 when arbiter 238 picks the corresponding write access for dispatch to the memory channel.

Power controller 250 generally includes an interface 252 to an advanced extensible interface, version one (AXI), an APB interface 254, and a power engine 260. Interface 252 has a first bidirectional connection to the SMN, which includes an input for receiving an event signal labeled "EVENT_n" shown separately in FIG. 2, and an output. APB interface 254 has an input connected to the output of interface 252, and an output for connection to a PHY over an APB. Power engine 260 has an input connected to the output of interface 252, and an output connected to an input of memory interface queue 214. Power engine 260 includes a set of configuration registers 262, a microcontroller (µC) 264, a self refresh controller (SLFREF/PE) 266, and a reliable read/write timing engine (RRW/TE) 268. Configuration registers 262 are programmed over the AXI bus, and store configuration information to control the operation of various blocks in memory controller 200. Accordingly, configuration registers 262 have outputs connected to these blocks that are not shown in detail in FIG. 2. Self refresh controller 266 is an engine that allows the manual generation of refreshes in addition to the automatic generation of refreshes by refresh logic 232. Reliable read/write timing engine 268 provides a continuous memory access stream to memory or I/O devices for such purposes as DDR interface maximum read latency (MRL) training and loopback testing.

Memory channel controller 210 includes circuitry that allows it to pick memory accesses for dispatch to the associated memory channel. In order to make the desired arbitration decisions, address generator 222 decodes the address information into predecoded information including rank, row address, column address, bank address, and bank group in the memory system, and command queue 220 stores the predecoded information. Configuration registers 262 store configuration information to determine how address generator 222 decodes the received address information. Arbiter 238 uses the decoded address information, timing eligibility information indicated by timing block 234, and active page information indicated by page table 236 to efficiently schedule memory accesses while observing other criteria such as quality of service (QoS) requirements. For example, arbiter 238 implements a preference for accesses to open pages to avoid the overhead of precharge and activation commands required to change memory pages, and hides overhead accesses to one bank by interleaving them with read and write accesses to another bank. In particular during normal operation, arbiter 238 normally keeps pages open in different banks until they are required to be precharged prior to selecting a different page.

Figure 3:
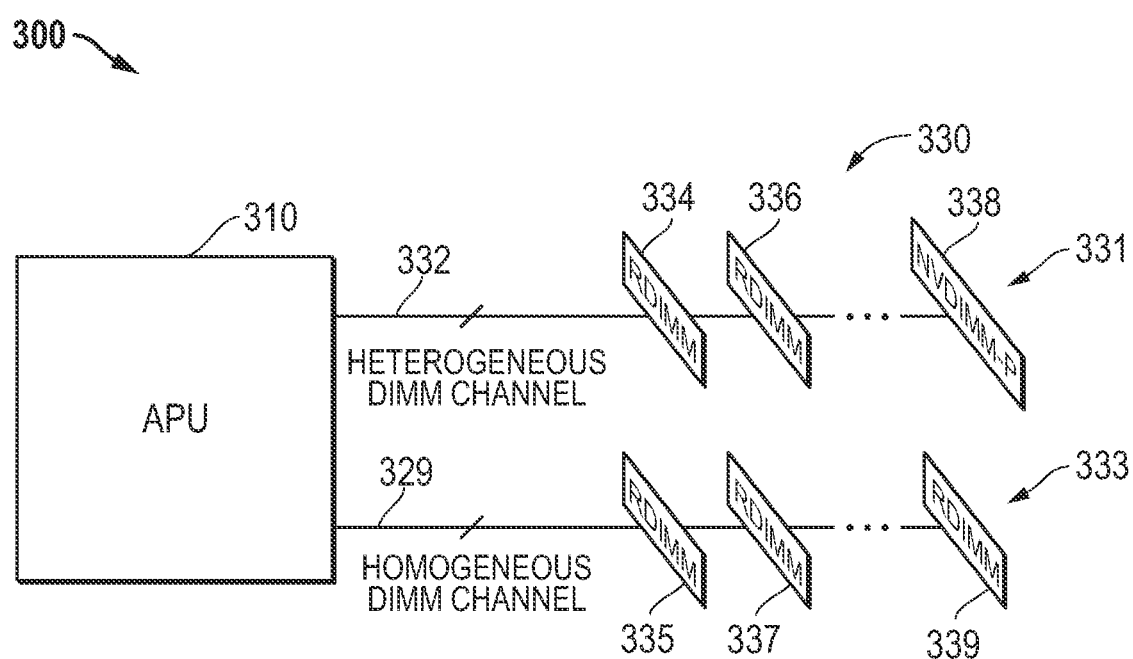
FIG. 3 illustrates in block diagram form a data processing system according to some embodiments.

FIG. 3 illustrates in block diagram form a data processing system 300 according to some embodiments. Data processing system 300 includes an APU 310 and a memory system 330. Various other parts of the system are not shown in order to focus on the memory arrangement. APU 310 includes memory controllers like memory controller 200 (FIG. 2) supporting heterogeneous memory channels to interface with memory system 330. In addition to normal DDRx memory channels, APU 310 supports NVDIMM-P 338 on a heterogeneous memory channel 330 having both normal registered DIMMs or RDIMMs 334 and 336 and NVDIMM-P 338, in addition to a homogeneous memory channel 340 having only RDIMMs 344, 346, and 348 connected over bus 342. Other DIMM types such as LRDIMMs and UDIMMs are supported in some embodiments. While in this embodiment heterogeneous memory channel 330 connects to both NVDIMM-Ps and RDIMMs, the heterogeneous memory channel has the ability to interface with all NVDIMM-P type DIMNIs in some embodiments.

According to the draft NVDIMM-P standard, transactions between the memory controller on APU 310 and NVDIMM-P 338 are protected by "Link" ECC. Link ECC ensures data integrity for the data transfer between the memory controller and the NVDIMM over bus 332. In accordance with known ECC mechanisms, it protects against data corruption on the link caused by a random or transient error. The protection varies according to the ECC code used. The ECC may allow, for example, single-bit correction with multiple-bit error detection. In response to detecting an uncorrectable error, the memory controller can replay the transaction so that a transient or random error will not persist, and can also report both correctable and uncorrectable errors to the operating system.

While NVDIMM-P type DIMNIs are described in this embodiment, other embodiments employ the techniques herein to interface with other types of storage class memory (SCM) modules over a heterogeneous memory channel. As used herein, SCM indicates a memory module with non-volatile memory that is addressable in the system memory space. The non-volatile memory in an SCM module can be buffered with RAM and/or paired with RAM on board the SCM module. The SCM memory address map appears alongside conventional DRAM population from the operating system (OS) perspective. The OS is typically aware that the SCM defined address range is a "different" type of memory than conventional memory. This distinction is to inform the OS that this memory may be more latent and has a persistent quality. The OS can map the SCM memory as Direct Access memory or Filesystem Access memory. Direct Access implies the OS accessing the SCM address range as physical addressable memory. File system access implies the OS manages the persistent memory as part of the file system and manages access to the SCM via file-based API. Ultimately the request comes to the memory controller within the SCM address range independent of how the OS at a higher level manages the access.

Figure 4:
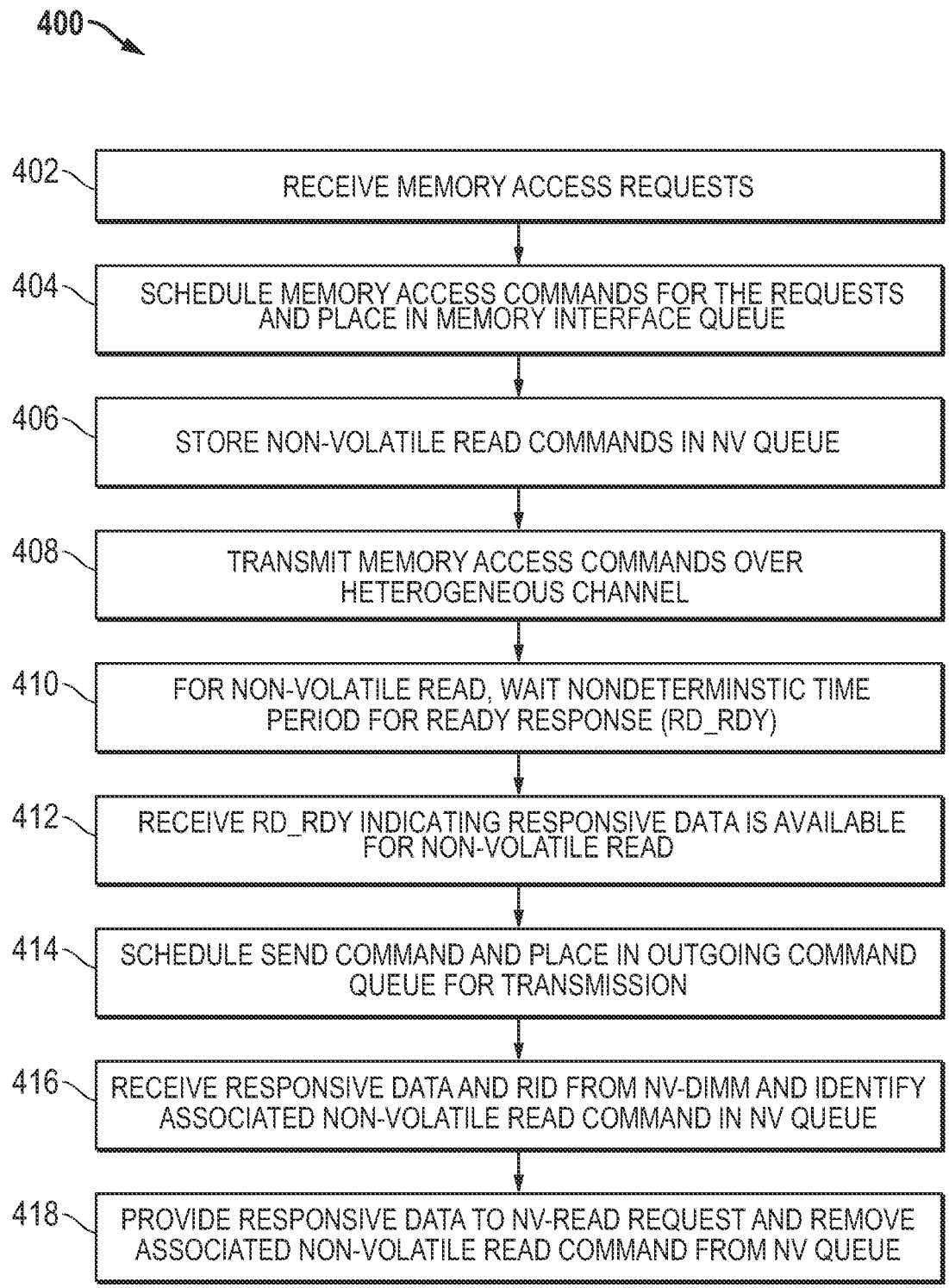
FIG. 4 is a flow diagram of a process for handing memory access requests according to some embodiments.

FIG. 4 is a flow diagram of a process 400 for handing memory access commands according to some embodiments. Process 400 is focused on the handling of non-volatile read commands, and is suitable for implementation with memory controller 200 of FIG. 2, or other memory controller arrangements. Process 400 begins at block 402 where it receives a plurality of memory access requests including volatile memory reads, volatile memory writes, non-volatile memory reads, and non-volatile memory writes. At block 404, memory access commands for filling the requests are scheduled and placed in a memory interface queue. Block 404 typically involves decoding memory access commands for the memory access requests, and may include holding the memory access commands in a command queue before they are scheduled and placed in the memory interface queue by an arbiter such as arbiter 238 (FIG. 2).

At block 406, process 400 stores the non-volatile read commands that are placed in the memory interface queue in a non-volatile command queue (NV queue). At block 408, memory access commands from the memory interface queue are transmitted over a heterogeneous memory channel coupled to at least one non-volatile dual in-line memory module (DIMM). In some embodiments, the memory channel is also coupled to at least one volatile DIMM.

As shown at block 410, for non-volatile read commands transmitted over the heterogeneous memory channel, the non-volatile DIMM will typically respond after a nondeterministic time period due to the unpredictable process of reading the requested data, which may be in non-volatile memory at the non-volatile DIMM, in DRAM at the non-volatile DIMM, or in a cache at the media controller. During the nondeterministic time period, other memory access commands are typically sent from the memory interface queue. When the media controller at the non-volatile DIMM completes the process of reading the requested data, it sends a ready response signal "RD_RDY" to the memory controller. The process waits to receive the RD_RDY for each non-volatile read. Typically, the RD_RDY signal is sent and received on a separate sub-channel of the heterogeneous memory channel than a sub-channel on which the memory interface queue receives responses to the memory access commands. For example, with a NVDIMM-P memory channel, the RD_RDY signal is typically sent on a "RSP_R" line of the memory channel separate from the "CMD" and "DQ" lines on which commands and data are transmitted.

At block 412, the RD_RDY signal is received from the non-volatile DIMM indicating that responsive data is available for an associated one of the non-volatile read commands. A control circuit, which in this example is NV buffer 247 (FIG. 2), receives the RD_RDY signal. In response, at block 414, NV buffer 247 places a SEND command in the memory interface queue. The SEND command is thereby scheduled or queued for transmission to the non-volatile DIMM.

Upon receiving the SEND command, the non-volatile DIMM media controller transmits the responsive data that was read for the non-volatile read command, including an associated identifier for the command back to the memory controller. The associated identifier in this embodiment is a read identifier "RID" for the read command. At block 416, the responsive data and associated identifier are received from the non-volatile DIMM at the memory controller. In response, the NV buffer at the memory controller uses the associated identifier to identify the non-volatile read command in the NV queue with the same associated identifier. At block 418, the responsive data is provided in fulfillment the associated non-volatile read request for which the non-volatile ready command was produced. This fulfills the request, and the associated non-volatile read command is removed from the NV queue.

In some embodiments, process 400 at block 404 includes scheduling the memory access commands with an arbiter such as arbiter 238 (FIG. 2). In one example, before placing the memory access commands in the memory interface queue, the process groups non-volatile read commands with other non-volatile read commands or volatile read commands. In some embodiments, process 400 at block 414 further includes, before placing the send command in the memory interface queue, grouping the send command with a group of non-volatile or volatile read commands before placing the send command in the memory interface queue. Because the response time of the SEND command is deterministic, memory interface queue 214 can intermingle SEND commands with other commands to volatile memory, such as normal DDRx reads and WRITEs, as well as non-volatile WRITEs.

Figure 5:
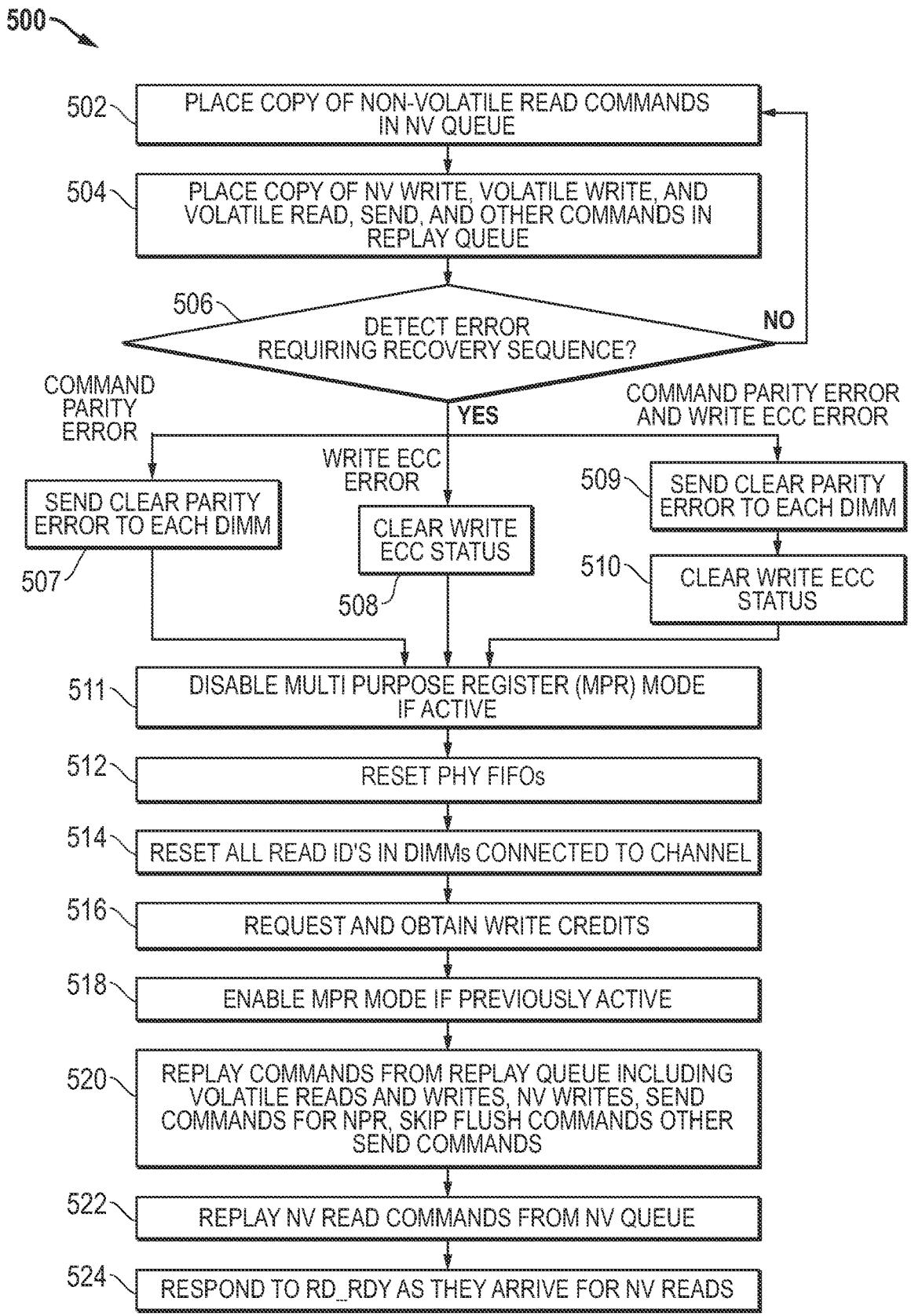
FIG. 5 is a flow diagram of a process for handling errors according to some embodiments.
Figure 6:
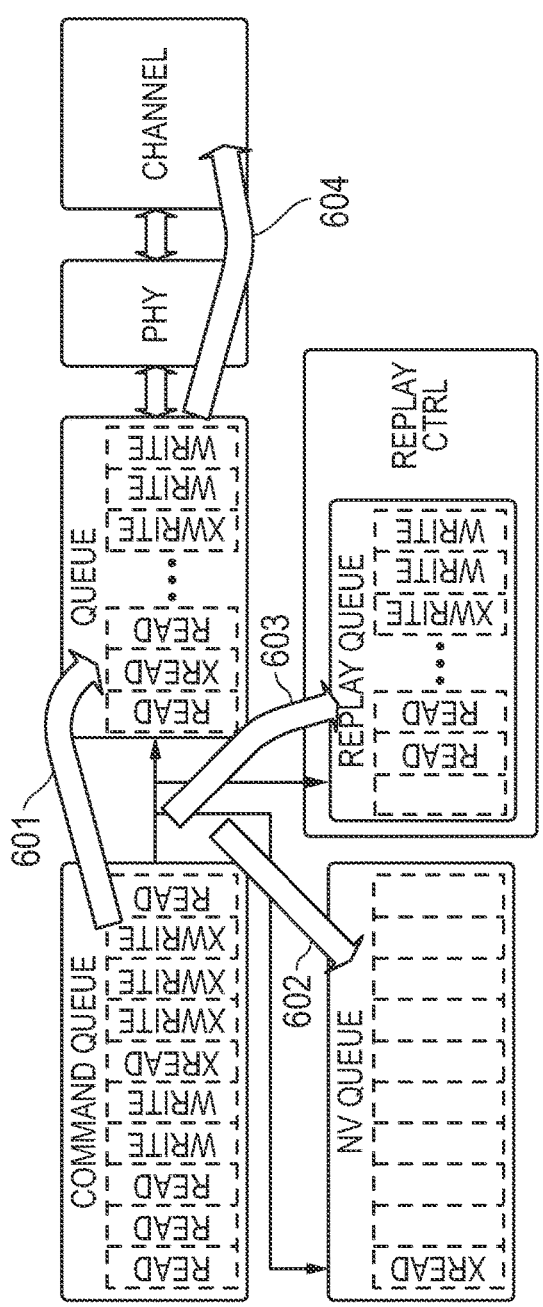
FIG. 6 illustrates in diagram form the process of FIG. 5.
Figure 7:
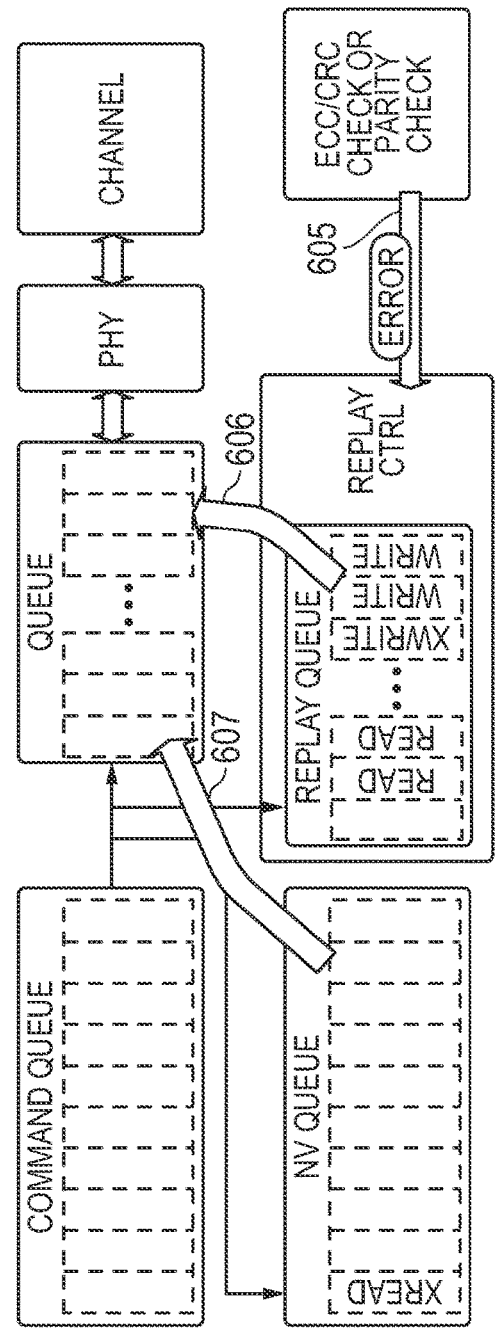
FIG. 7 illustrates in diagram form further parts of the process of FIG. 5.

FIG. 5 is a flow diagram of a process for handling errors according to some embodiments. FIG. 6 and FIG. 7 are a sequence of diagrams 600 and 700 illustrating the process of FIG. 5. Referring to FIGS. 5-7, process 500 generally handles storing commands and providing a recovery sequence in which the channel and the non-volatile DIMM are reset, and then recent commands are replayed to correct errors. While the blocks are shown in a particular order, this order is not limiting and some of the blocks occur in parallel on an ongoing basis. Process 500 is suitable to be performed by memory controller 200 (FIG. 2) or other memory controllers with a suitable NV queue and replay queue and error detection capabilities.

At block 502, copies of non-volatile read commands are stored in the NV queue as they are placed in the memory interface queue for transmission to the respective non-volatile DIMM. This is illustrated in diagram 600 by arrow 601 showing commands going to the memory interface queue as they are selected for transmission, and arrow 602 showing a copy of non-volatile read commands being stored in the NV queue. Other types of commands have copies stored in the replay queue as shown at block 504, including non-volatile writes, volatile writes, volatile reads, SEND commands, and other memory access commands. Diagram 600 at arrow 603 shows the other commands being stored in the replay queue. Blocks 502 and 504 occur on an ongoing basis as the memory controller handles memory access requests.

While no errors are detected, process 500 continues to store commands in the NV queue and the replay queue, where they are held until they are fulfilled and removed from their respective queue. Process 500 at block 506 detects whether there was an error at one of the DIMMs or on the memory channel which requires a recovery sequence, and begins a recovery sequence and goes to one of block 507, 508, or 509 depending on the nature of the error(s) detected. If the error detected is a command parity error, process 500 goes from block 506 to block 507, where it sends a command to clear parity errors at each DIMM on the memory channel. If a write or read ECC error is detected, process 500 goes to block 508, where it clears the write or read ECC status. If both a command parity error and a write/read ECC error are detected, process 500 goes to block 509, where it sends the command to clear parity errors at each DIMM on the channel, and then goes to block 510 where it clears the write or read ECC status. In some embodiments, block 509 also proceeds to block 510 if the process is unable to determine an error type, clearing errors for both error types to ensure the error status is completely cleared. Then process 500 goes to block 511 to continue the recovery sequence.

At block 511, if Multi-Purpose Register (MPR) mode is currently active, it is disabled. The memory controller resets the first-in-first-out (FIFO) buffers of the PHY at block 512. At block 514, all of the read ID's (RIDs) are reset in the non-volatile DIMMs on the memory channel and the channel buffer. In some embodiments, block 514 includes sending a reset RID (RST_RID) command, waiting for a ready (RDY) response, and sending a SEND command, and waiting for a resulting data packet to confirm that all outstanding reads have been reset so the non-volatile DIMM does not send any more RDY responses for pending read commands.

If write credits are needed, they are requested and obtained at block 516. In some embodiments, block 516 includes sending a write status command to determine how many write credits are available for the non-volatile DIMM, determining if more write credits are needed, and then requesting and obtaining more write credits. The requests may include looping through multiple write credit requests until sufficient write credits are received.

If the MPR mode was active prior to the recovery sequence, it is again enabled at block 518 in order to place the non-volatile DIMM in the same condition it was in when the error occurred to replay the necessary commands.

At this point the recovery sequence has reset and cleared the various parts of the channel and non-volatile DIMM in order to begin replaying commands. At block 520, process 500 begins replaying commands starting with selected commands from the replay queue. In some embodiments, the selected commands include any volatile reads, multi-purpose register (MPR)-related commands, SEND commands associated with MPR-related commands, volatile writes, and non-volatile writes that are present in the replay queue. SEND commands associated with non-volatile reads are stored in the replay queue for reporting and debug purposes, but are not transmitted at block 520. FLUSH commands present in the replay queue are also not replayed.

Preferably the blocks from block 506 to block 520 are performed under control of replay control logic 231 (FIG. 2)

or a similar replay control circuit. Then the process passes control to NV buffer 247 in order to complete non-volatile read command replays.

At block 522, process 500 includes replaying all non-volatile reads that are stored in the NV queue by sending them to the memory interface queue. Preferably, this replaying occurs in a group after transmitting all the selected memory access commands that are stored in the replay queue. In other embodiments, the non-volatile reads are replayed in a group before the commands replayed at block 520. As explained with respect to FIG. 4, non-volatile reads have a nondeterministic response time, which means the SEND commands that were originally transmitted following a RD_RDY response for a non-volatile read are not necessarily transmitted again in the same order. To handle this ordering, process 500 includes skipping SEND commands stored in the replay queue that are associated with non-volatile reads, and at block 524 responding to the RD-RDY responses as they arrive for non-volatile reads by generating new SEND commands in response to read ready (RD_RDY) responses received from the non-volatile DIMM during the recovery sequence. At this point, the replay sequence is complete and the memory controller ends the replay sequence and returns to its normal operating conditions.

Thus, a memory controller and data processing system as described herein improves the ability of the memory controller to interface with non-volatile DIMMs. Moreover, the memory controller herein reduces the length of the memory interface queue by eliminating the need for the memory interface queue to hold non-volatile read commands that have nondeterministic and potentially long latencies until they are fulfilled.

Memory controller 200 of FIG. 2 or any portions thereof, such as arbiter 238, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, the internal architecture of memory channel controller 210 and/or power engine 250 may vary in different embodiments. Memory controller 200 may interface to other types of memory besides NVDIMM-P memory, such as high bandwidth memory (HBM), RAMbus DRAM (RDRAM), and the like. While the illustrated embodiment showed each rank of memory corresponding to separate DIMMs, in other embodiments each DIMM can support multiple ranks. Further, while a heterogeneous memory channel is generally supported, the channel may be filled entirely with non-volatile DIMMs. Further, while two separate queues have been described for accomplishing the recovery and replay, a single special-purpose storage queue is employed in some embodiments.

Accordingly, it is intended by the appended claims to cover all modifications of the disclosed embodiments that fall within the scope of the disclosed embodiments.

What is claimed is:

1. A memory controller embodied in an integrated circuit, comprising:
    an arbiter for selecting memory access commands, including volatile reads, volatile writes, non-volatile reads, and non-volatile writes, for transmission over a heterogeneous memory channel to at least one storage class memory (SCM) module;
    at least one storage queue storing memory access commands that are selected for transmission; and
    a replay control circuit for, responsive to an error condition, initiating a recovery sequence in which the replay control circuit transmits the selected memory access commands from the at least one storage queue by grouping non-volatile read commands together separately from all pending volatile reads, volatile writes, and non-volatile writes.

2. The memory controller of claim 1, wherein the replay control circuit further transmits the selected memory access commands from the at least one storage queue by delaying transmission of all non-volatile reads until all pending volatile reads, volatile writes, and non-volatile writes have been transmitted.

3. The memory controller of claim 1, wherein the at least one storage queue includes a non-volatile command queue for storing non-volatile reads that are selected for transmission, and a replay queue for storing other selected memory access commands that are selected for transmission.

4. The memory controller of claim 3, wherein the recovery sequence includes skipping SEND commands stored in the replay queue that are associated with non-volatile reads, and generating new SEND commands in response to read ready (RD_RDY) responses received from the at least one SCM module during the recovery sequence.

5. The memory controller of claim 1, wherein the recovery sequence includes, before transmitting the selected memory access commands, resetting non-volatile reads for all read identifiers (RIDs) in a buffer for the heterogeneous memory channel.

6. The memory controller of claim 1, wherein the recovery sequence includes requesting and obtaining write credits for buffers on the at least one SCM module.

7. The memory controller of claim 1, wherein the error condition is one of a command parity error, a write command error correction code (ECC) error associated with the at least one SCM module, and a read command ECC error associated with the at least one SCM module.

8. A method, comprising:
    from a plurality of memory access commands including volatile memory reads, volatile memory writes, non-volatile memory reads, and non-volatile memory writes, selecting by an arbiter memory access commands for transmission over a heterogeneous memory channel to at least one storage class memory (SCM) module;
    storing memory access commands that are selected for transmission in at least one storage queue; and
    responsive to an error condition, performing a recovery sequence including transmitting the selected memory access commands from the at least one storage queue by grouping transmission of all non-volatile reads separately from all pending volatile reads, volatile writes, and non-volatile writes.

9. The method of claim 8, further comprising transmitting the selected memory access commands from the at least one storage queue by delaying the transmission of all non-volatile reads until all pending volatile reads, volatile writes, and non-volatile writes have been transmitted.

10. The method of claim 8, wherein the at least one storage queue includes a non-volatile command queue for storing non-volatile reads that are selected for transmission, and a replay queue for storing selected memory access commands that are selected for transmission.

11. The method of claim 10, wherein the recovery sequence includes skipping SEND commands stored in the replay queue that are associated with non-volatile reads, and generating new SEND commands in response to read ready responses received from the at least one SCM module during the recovery sequence.

12. The method of claim 8, wherein the recovery sequence includes, before transmitting the selected memory access commands, resetting non-volatile reads for all read identifiers in a buffer for the heterogeneous memory channel.

13. The method of claim 8, wherein the recovery sequence includes requesting and obtaining write credits for buffers on the at least one SCM module.

14. The method of claim 8, wherein the error condition is one of a command parity error, a write command error correction code (ECC) error associated with the at least one SCM module, and a read command ECC error associated with the at least one SCM module.

15. A data processing system, comprising:
a central processing unit;
a data fabric coupled to the central processing unit; and
a memory controller coupled to the data fabric for fulfilling memory access requests from the central processing unit, the memory controller comprising:
an arbiter for selecting memory access commands, including volatile reads, volatile writes, non-volatile reads, and non-volatile writes, for transmission over a heterogeneous memory channel to at least one storage class memory (SCM) module;
at least one storage queue storing memory access commands that are selected for transmission; and
a replay control circuit for, responsive to an error condition, initiating a recovery sequence in which the replay control circuit transmits the selected memory access commands from the at least one storage queue by grouping non-volatile read commands together separately from all pending volatile reads, volatile writes, and non-volatile writes.

16. The data processing system of claim 15, wherein the replay control circuit further transmits the selected memory access commands from the at least one storage queue by delaying transmission of all non-volatile reads until all pending volatile reads, volatile writes, and non-volatile writes have been transmitted.

17. The data processing system of claim 15, wherein the at least one storage queue includes a non-volatile command queue for storing non-volatile reads that are selected for transmission, and a replay queue for storing selected memory access commands that are selected for transmission.

18. The data processing system of claim 17, wherein the recovery sequence includes skipping SEND commands stored in the replay queue that are associated with non-volatile reads, and generating new SEND commands in response to read ready responses received from the at least one SCM module during the recovery sequence.

19. The memory controller of claim 15, wherein the recovery sequence includes, before transmitting the selected memory access commands, resetting non-volatile reads for all read identifiers in a buffer for the heterogeneous memory channel.

20. The data processing system of claim 15, wherein the error condition is one of a command parity error, a write command error correction code (ECC) error associated with the at least one SCM module, and a read command ECC error associated with the at least one SCM module.

* * * * *